(12) United States Patent
Vauclair

(10) Patent No.: US 8,621,187 B2
(45) Date of Patent: Dec. 31, 2013

(54) METHOD OF PROGRAM OBFUSCATION AND PROCESSING DEVICE FOR EXECUTING OBFUSCATED PROGRAMS

(75) Inventor: Marc Vauclair, Overijse (BE)

(73) Assignee: NXP, B.V., Eindhoven (NL)

( * ) Notice: Subject to any disclaimer, the term of this patent is extended or adjusted under 35 U.S.C. 154(b) by 716 days.

(21) Appl. No.: 12/866,866

(22) PCT Filed: Feb. 9, 2009

(86) PCT No.: PCT/IB2009/050504
§ 371 (c)(1),
(2), (4) Date: Aug. 9, 2010

(87) PCT Pub. No.: WO2009/101562
PCT Pub. Date: Aug. 20, 2009

(65) Prior Publication Data
US 2010/0332759 A1 Dec. 30, 2010

(30) Foreign Application Priority Data
Feb. 11, 2008 (EP) .................................... 08101486

(51) Int. Cl.
*G06F 9/32* (2006.01)

(52) U.S. Cl.
USPC .......................................... 712/234; 712/230

(58) Field of Classification Search
USPC ................. 712/204, 230, 231, 234, 243, 245; 711/202, 209, 221; 713/189, 190
See application file for complete search history.

(56) References Cited

U.S. PATENT DOCUMENTS 4,679,141 A * 7/1987 Pomerene et al. ............ 712/240
4,926,323 A * 5/1990 Baror et al. ................... 712/238

(Continued)

FOREIGN PATENT DOCUMENTS

EP 401992 A2 * 12/1990
WO 00/77596 A1 12/2000

(Continued)

OTHER PUBLICATIONS

Barak, Boaz; "Can We Obfuscate Programs"; Retreived From http://www.math.ias/edu/boaz/Papers/obf_informal.html 7 pages.

(Continued)

*Primary Examiner* — Aimee Li

(57) ABSTRACT

A program is obfuscated by reordering its instructions. Original instruction addresses are mapped to target addresses. A cache efficient obfuscated program is realized by restricting target addresses of a sequence of instructions to a limited set of the disjoint ranges (33a-d) of target addresses, which are at lease half filled with instructions. Mapped address steps (34) are provided between the target addresses to which successive ones of the original instruction addresses are mapped. The address steps (34) include first address steps within at least a first one of the mutually disjoint ranges (33a-d). Between said first address steps, second address steps within at least a second one of the mutually disjoint ranges (33a-d). Thus, a deviation from successive addresses for logically successive instructions is realized. In an embodiment the mapping of original instruction addresses to target addresses may be visualized by means of a path (36) along points in an n-dimensional array, where n is greater than one. Successive original instruction addresses are mapped to successive locations in the path, and locations along respective rows of the array are mapped to respective ones of the mutually disjoint ranges (33a-d). Because an n-dimensional path is used a form of locality is preserved that provides for cache efficiency, whereas the multi-dimensional nature of the path makes it possible to combine this locality with pseudo-random steps.

6 Claims, 4 Drawing Sheets

(56) References Cited

U.S. PATENT DOCUMENTS

| | | | |
|---|---|---|---|
| 5,136,697 A * | 8/1992 | Johnson | 712/239 |
| 5,559,884 A | 9/1996 | Davidson et al. | |
| 6,594,761 B1 | 7/2003 | Chow et al. | |
| 6,779,114 B1 | 8/2004 | Chow et al. | |
| 6,842,862 B2 | 1/2005 | Chow et al. | |
| 7,065,656 B2 | 6/2006 | Schwenck et al. | |
| 7,070,252 B2 | 7/2006 | De Queiroz et al. | |
| 7,188,241 B2 | 3/2007 | Cronce et al. | |
| 7,430,670 B1 * | 9/2008 | Horning et al. | 713/190 |
| 7,779,270 B2 * | 8/2010 | Horning et al. | 713/187 |
| 7,779,394 B2 * | 8/2010 | Horning et al. | 717/136 |
| 7,823,135 B2 * | 10/2010 | Horning et al. | 717/127 |
| 2003/0236986 A1 | 12/2003 | Cronce et al. | |
| 2005/0069138 A1 | 3/2005 | De Jong | |
| 2005/0166191 A1 | 7/2005 | Kandanchatha et al. | |
| 2005/0204348 A1 * | 9/2005 | Horning et al. | 717/140 |
| 2005/0246554 A1 | 11/2005 | Batson | |
| 2006/0248311 A1 * | 11/2006 | Jennings | 712/22 |
| 2007/0039048 A1 | 2/2007 | Shelest et al. | |
| 2007/0234070 A1 * | 10/2007 | Horning et al. | 713/190 |
| 2009/0307500 A1 * | 12/2009 | Sato et al. | 713/190 |

FOREIGN PATENT DOCUMENTS

| | | |
|---|---|---|
| WO | 00/77597 A1 | 12/2000 |
| WO | 01/14953 A1 | 3/2001 |
| WO | 01/79969 A2 | 10/2001 |
| WO | 02/46890 A2 | 6/2002 |
| WO | 02/095546 A2 | 11/2002 |
| WO | 02/101519 A2 | 12/2002 |
| WO | 03/003169 A2 | 1/2003 |
| WO | 03/012603 A2 | 2/2003 |
| WO | 03/046698 A1 | 6/2003 |
| WO | 03/065639 A2 | 8/2003 |
| WO | 2005/125081 A2 | 12/2005 |

OTHER PUBLICATIONS

Gruenbacher, H.; "Pipelining in Der Rechnerarchitektur. Pipelining in Computer Architecture"; Elektrotechnik Und Informationstechnik, Springer Verlag, Wien, AT; vol. 114, No. 1; pp. 27-31; Cited by International Searching Authority for application PCT/IB2009/050504, XP000688448, Engish Abstract Included (Jan. 1, 1997).

Hennessy, J. L., et al; "Computer Architecture. A quantative approach, passage"; Computer Architecture: A Quantitative Approach, pp. 390-423, Cited by International Searching Authority for application PCT/IB2009/050504, XP002318184 (Jun. 1, 2002).

Hennessy, J., et al; "Computer Architecture—A quantative approach"; Passage Computer Architecture: A Quantitative Approach; pp. 181-187; Cited by International Searching Authority for application PCT/IB2009/050504, XP002388271 (Jan. 1, 2002).

De Bruin, Arie; "Go to Statements: Semantics and Deduction Systems"; ACTA Informatica 15, Springer-Verlag; 40 Pages (1981).

US 5,748,741, 05/1998, Johnson et al. (withdrawn).

Barak, Boaz; "Can We Obfuscate Programs"; Retreived From http://www.math.ias/edu/boaz/Papers/obf_informal.html 7 pages, (Jun. 25, 2004).

Barak, Boaz, et al; "On the (IM)Possibility of Obfuscating Programs"; 22 Pages; (Nov. 13, 2001).

Barak, Boaz; "Non-Black-Box Techniques in Cryptography"; Thesis; The Weizmann Institute of Science, Isreal; (Jan. 6, 2004).

Chouchane, Mohammed R.; "On Program Obfuscation: A Survey"; 9 Pages (2004).

Lynn, Benjamin, et al; "Positive Results and Techniques for Obfuscation"; 18 Pages (Feb. 28, 2004).

Chung, Sae-Young; "On the Construction of Some Capacity-Approaching Coding Schemes"; Massachusetts Institute of Technology (Sep. 2000).

Collberg, Christian, et al; "A Taxonomy of Obfuscating Transformations"; University of Auckland; 36 Pages (1997).

Collberg, Christian, et al; "Watermarking Tamper-Proofing, and Obfuscation—Tools for Software Protection"; University of Arizona Computer Science Technical Report 2000-03; University of Auckland Computer Science Technical Report #170; 17 Pages (Feb. 10, 2000).

Dickau, Robert M.; "Two-Dimensional L-Systems"; MATHFORUM.ORG; 11 Pages (1996).

Gotsman, Craig, et al; "Euclidean Voronoi Labelling on the Multidimensional Grid"; Department of Computer Science, Technion—Isreal Institute of Technology, Isreal; 11 Pages (1995).

Gotsman, C., et al; "On the Metric Properties of Discrete Space-Filling Curves"; IEEE Trans on Image Processing, vol. 5, No. 5; 4 Pages (May 1996).

Lai, Hongying; "A Comparative Survey of Java Obfuscators Available on The Internet"; Univ of Auckland, Comp Science Dept; 115 Pages (Feb. 22, 2001.

Kamata, Sei-Ichiro, et al; "An Address Generator of a Pseudo-Hilbert Scan in a Rectangle Region"; Proceedings of the 1997 Intl Conf on Image Processing; 4 Pages (1997).

Lawder, J. K.; "Calculation of Mappings Between One and N-Dimensional Values Using the Hilbert Space-Filling Curve"; Birbeck College, University of London; 13 Pages (200).

Low, Douglas; "Java Control Flow Obfuscation—Thesis"; University of Auckland; 151 Pages (Jun. 2, 1998).

MacDonald, Josh; "On Program Security and Obfuscation"; 10 Pages; (Dec. 10, 1998).

McCool, Michael D., et al; "Incremental and Hierarchical Hilbert Order Edge Equation Polygon Rasterization"; Graphics Hardware; 8 Pages (2001).

Moon, Bongki, et al; "Analysis of the Clustering Properties of the Hilbert Space-Filling Curve"; IEEE Transactions on Knowledge and Data Engineering, vol. 13, No. 1; 18 Pages (Jan./Feb. 2001).

Wyseur, Brecht, et al; "Cryptanalysis of White-Box Des Implementations With Arbitrary External Encodings" Cryptology Eprint Archite, Report 2007/104; 16 Pages; http://eprint.iacr.org/2007/104.pdf (Mar. 21, 2007).

International Search Report and Written Opinion for Application PCT/IB2009/050504 (Feb. 9, 2009).

* cited by examiner

METHOD OF PROGRAM OBFUSCATION AND PROCESSING DEVICE FOR EXECUTING OBFUSCATED PROGRAMS

FIELD OF THE INVENTION

The invention relates to a data processing device comprising a programmable processor and to a method of converting a program of instructions for a programmable processor.

BACKGROUND

Code obfuscation is a general name for techniques for converting a program of instructions for a computer in a way that obscures its content. Code obfuscation may be applied to make it more difficult to identify the relevant part of the program needed to execute a program on an unlicensed type of computer or without protection measures.

U.S. Pat. No. 6,779,114 describes a code obfuscation technique that involves obscuring control flow of a program. Branch instructions are added to lumps of instructions in a way that obscures the intended execution order of the lumps. U.S. Pat. No. 5,559,884 describes pseudo-random reordering of basic blocks of a program to create a signature that can be used to identify a source through which the program has been distributed.

Many modern processors use instruction caching, prefetching and/or pipelining techniques, which rely on locality of program flow. The addition of branch instructions with obscure targets reduces locality, which may have the effect of preventing some of the gain in execution speed that is expected from such techniques.

SUMMARY

Among others, it is an object to provide for obfuscation of programs wherein cache use efficiency is supported.

According to an example embodiment, a method of converting a program of instructions for a programmable processor is provided. In the method a sequence of original instruction addresses within the original address space is mapped to a limited set of ranges of target addresses for addressing reordered instructions. Address steps between the target addresses of successive original instruction addresses comprise first address steps within a first one of the ranges and, between these first address steps, second address steps within at least a second one of the ranges. Limiting the number of ranges promotes the possibility of joint caching of instructions whose original instruction addresses are near to each other. By stepping to different ranges in between address steps within a range, the order of instructions within the range is obscured, making it difficult to reconstruct the program. Also, this makes it possible to use address steps with mutually opposite sign (direction) within a range and or between ranges.

In an embodiment only address steps of one instruction length are used within each range, for example both backward and forward steps of this size. The use of intermediate excursion to other ranges makes it possible to do so while avoiding a simple sequence of successively executed instructions within the range. By using address steps of one instruction length caching is facilitated even more.

According to an example embodiment, a processing device is provided for executing the converted program. This processing device addresses successive instructions in correspondence with the rearranged addresses. In other embodiments the programs may be executed for example by a processor that rearranges the sequence of the instructions in a local memory before execution. In another example programs may be used that include added jump instructions to enable a processor to execute the program in normal order, or separate information may be provided to enable the processor to do so.

BRIEF DESCRIPTION OF THE DRAWINGS

These and other objects and advantageous aspects will become apparent from a description of exemplary embodiments, using the following Figures.

DETAILED DESCRIPTION OF EXEMPLARY EMBODIMENTS

Basic Data Processing Device

Figure 1:
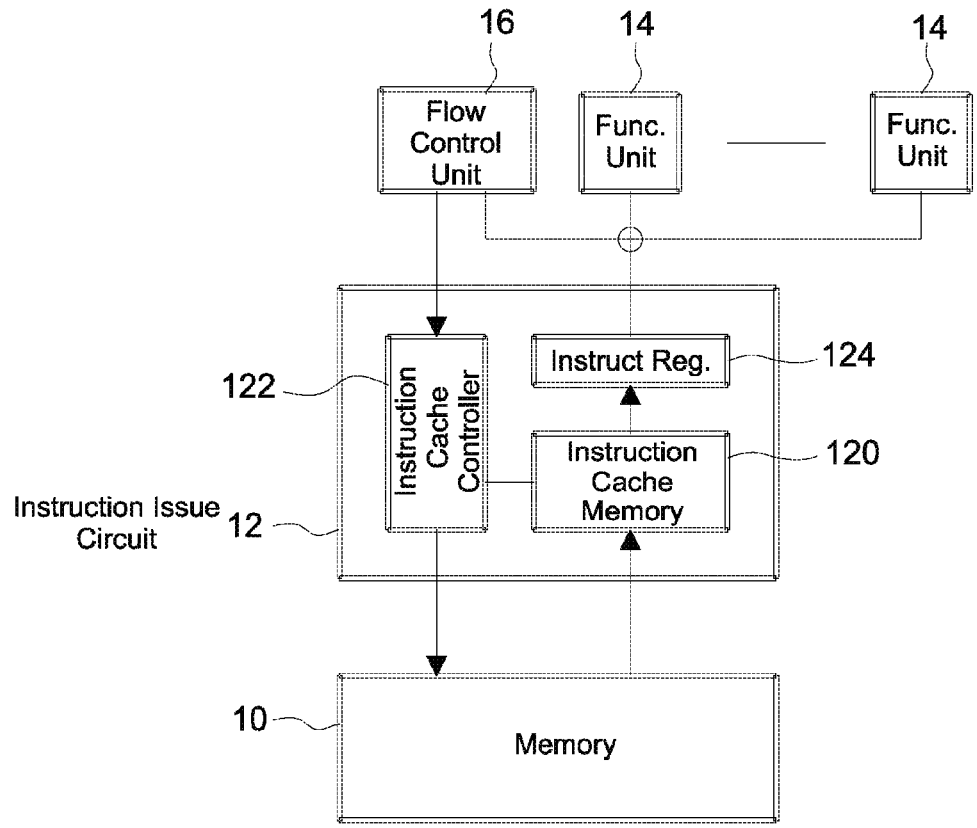
FIG. 1 shows a data processing device

FIG. 1 shows a data processing device, for example an integrated circuit. Except for its program flow control unit 16, the processing device may have a conventional architecture, comprising a memory 10, an instruction issue circuit 12 and a plurality of functional units 14, along with the program flow control unit 16. Instruction issue circuit 12 has an address output and an instruction input coupled and address input and a data output of memory 10, respectively. Instruction issue circuit 12 has an instruction output coupled to functional units 14 and the program flow control unit 16. Program flow control unit 16 has an address output coupled to instruction issue circuit 12.

Program flow control unit 16 is configured to ensure proper execution of a program of which the instruction sequence has been reordered in order to obfuscate program content. In an embodiment a reordering is used that minimizes reduction of the effectively of instruction caching.

Figures 1A, 1B:
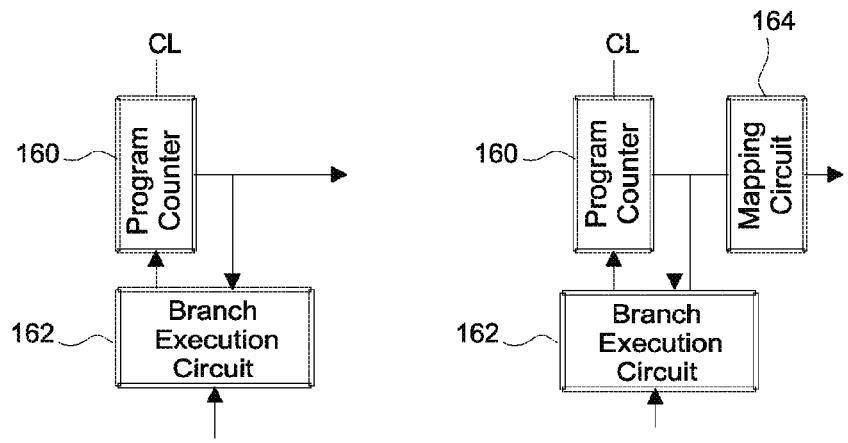
FIGS. 1a-d show a program flow control unit

FIG. 1a shows a first embodiment of a program flow control unit 16. In this embodiment program flow control unit 16 comprises a program counter 160 and a branch execution circuit 162. Program counter 160 has an output coupled to the instruction issue circuit (not shown). Branch execution circuit 162 has an input coupled to the instruction issue circuit (not shown) from receiving branch commands and an output and input coupled to program counter 160. In operation program counter 160 counts up in successive instruction cycles indicated by a clock CL. Optionally the increments may be controlled by an instruction length code received from an instruction decoder (not shown), when instructions are not stored at constant distance. The count values serve as addresses of instructions that are supplied to the instruction issue circuit. In instruction cycles wherein branch execution circuit 162 has received a branch command and it has determined that the branch command must be taken, branch execution circuit 162 overwrites the program counter value according to the branch, typically adding or subtracting a branch distance to the program counter value.

FIG. 1b shows an embodiment of a program flow control unit 16 that additionally comprises a mapping circuit 164. Program counter 160 has its output coupled to the instruction issue circuit (not shown) through mapping circuit 164. In operation program counter 160 counts up in successive instruction cycles, optionally with increments that are controlled by instruction length. Mapping circuit 164 maps the count values to target addresses, which it supplies to instruction issue circuit. Mapping circuit 164 may be realized as a look-up table circuit, such as a look-up memory that stores target addresses at locations addressed by count values. A set of target addresses that are randomly assigned to respective count values may be used for example. As an alternative for a look-up circuit, or in combination with such a look-up circuit an arithmetic circuit may be used for computing addresses, or a specially designed logic circuit may be used for computing addresses. Such a circuit may be configured to map each count value to a respective, pseudo randomly selected one of a set of target addresses. In an embodiment the signs of the address steps between logically successive instructions may have pseudo random probability, that is, address steps one direction may be equally frequent as steps in the other direction. Thus, even if only a limited number of step sizes is used, the signs of the steps may be random. Also the joint probability of successive steps may be random, so that a step in one direction is followed equally frequently by a step in another direction as by a step in the same direction.

Alternatively, other mappings may be used. In instruction cycles wherein branch execution circuit 162 has received a branch command and it has determined that the branch command must be taken, branch execution circuit 162 overwrites the program counter value according to the branch, typically adding or subtracting a branch distance to the program counter value.

Figures 1C, 1D:
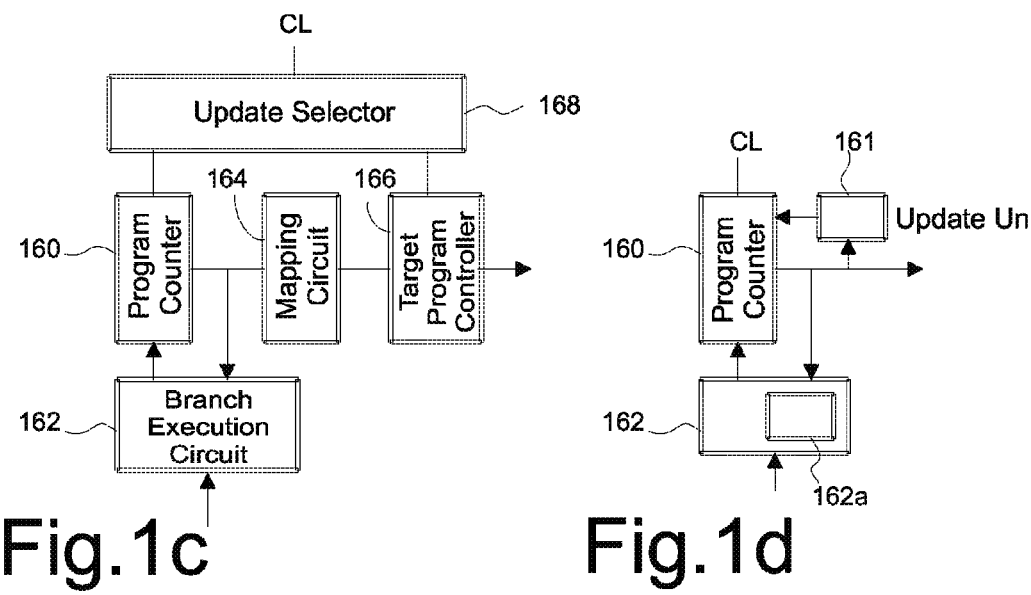

FIG. 1c shows an alternative embodiment of a program flow control unit 16 for use with blocks of instruction addresses that are mapped consecutively. This embodiment comprises an additional target program counter 166, coupled between mapping circuit 164 and the instruction memory (not shown), and an update selector 168. Update selector 168 controls when program counter 160 increments and whether target program counter 166 is incremented or updated from mapping circuit 164. In operation program counter 160 increments at the start of each block and target program counter 166 copies the mapped program counter value of program counter 160 at the start of the block. Within the block target program counter 166 is incremented. The start of the blocks may be controlled for example by information included in the program, or by automatically starting a new block when executing specific types of instructions.

FIG. 1d shows an embodiment of a program flow control unit 16 with an update unit 161. Update unit 161 controls updates of the instruction address when no jump is executed. In an embodiment update unit is configured to output address steps to program counter 160 and program counter 160 adds the address steps to the program counter value. Update unit 161 selects the address steps dependent on the program counter value, with step values that will be described in the following. Pseudo random steps may be used for example. In an embodiment update unit 161 comprises a look-up memory to look up steps for respective program counter values. Alternatively a logic circuit designed generating address steps may be used. In another embodiment update unit outputs part or all of the next program counter value determined from the previous program counter value. A look-up memory may be used to retrieve the next program counter value using the previous program counter value. In this way address steps are realized without using an addition in program counter 120. Optionally branch execution circuit 162 may comprise a branch target look-up memory 162a for looking up branch targets of jump instructions in correspondence way in which the instruction addresses are updated. In an embodiment branch execution circuit 162 comprises a computation circuit (not separately shown) for computing branch target addresses.

Instruction issue circuit 12 comprises an instruction cache memory 120, an instruction cache controller 122 and an instruction register 124. Instruction cache controller 122 has an input coupled to the address output of program flow control unit 16 and outputs coupled to memory 10 and instruction cache memory 120. Instruction cache memory 120 has an input coupled to memory 10 and an output coupled to instruction register 124. Instruction register 124 has an output coupled to functional units 14, 16. Functional units 14, 16 may be coupled to one or more register files (not shown) and/or data memories (not shown). In a further embodiment (not shown), functional units 14, 16 may also be coupled to memory 10.

In operation functional units 14, 16 execute successive instructions in successive instruction cycles. Program flow control unit 16 determines addresses of instructions that must be executed by functional units 14, 16 and indicates these addresses to instruction issue circuit 12. Instruction cache controller 122 determines whether instructions from these addresses are available in instruction cache memory 120 and causes the instructions to issue to instruction register 124 from instruction cache memory 120. If an instruction is not present in instruction cache memory 120, instruction cache controller 122 causes the instruction to be fetched from memory 10 into instruction cache memory 10 (optionally as part of a larger block of instructions).

Cache misses are related to lack of locality. Generally a cache miss is less likely to occur when going from a first instruction address to a second, when the first and second instruction address are so close that they will be kept in cache together on the basis of their addresses. This usually applies to adjacent addresses but it may also apply to addresses at a greater distance. Addresses are said to be local relative to each other when their content will be stored in instruction cache memory 120 on the basis of their proximity. Typically a locality distance can be defined for the cache as the maximum distance between addresses for which content will be stored jointly due to the similarity between their addresses. In a simple example, wherein the content of lines, each with a plurality of addresses, are cached in instruction cache memory 120, addresses are local relative to each other if they belong to the same line. In this case the locality distance is the line length. In another example, wherein a moving window of addresses is cached in instruction cache memory 120, addresses at the beginning of the window being replaced by addresses at the end of the window when the window moves forward, addresses are local relative to each other if their distance is less than the window size. In this case the locality distance is the window size.

When instructions are cached in cache lines, of for example sixty four or a hundred and twenty eight instruction addresses, cache misses can be avoided if program flow can be limited to a limited number of cache lines, that is to within a limited number of address ranges, so that the ranges can be cached together.

It should be appreciated that many alternative instruction issue circuit architectures and management methods are possible. For example, instructions may be stored in memory 10 in compressed and/or encrypted form, in which case a decompressor and/or decryption circuit may be used between cache memory and memory 10 and/or instruction register 124. Instruction cache memory 120 may be bypassed in some cases. At present a simple instruction cache memory is used by way of illustration.

Program flow control unit 16 may comprise a program counter register that it updates in each instruction cycle. When program flow control unit 16 receives branch instructions (also called jump instructions), it performs the updates according to the branch instructions. Otherwise, program flow control unit 16 applies a locally defined update. In an embodiment, program flow control unit 16 adds the current instruction length to the content of the program counter register in each instruction cycle wherein no branch is performed.

In a further embodiment, pre-fetching may be used in this case program flow control unit 16 and or instruction cache controller 122 computes predicted addresses of instructions that are expected to be executed in the future and instruction cache controller 122 pre-fetches these instructions. Predicted addresses may be formed for example by applying the locally defined update in advance, i.e. under the assumption that no branch instructions will be encountered. In addition other techniques, such as branch prediction may be used to compute predicted addresses.

In an alternative embodiment a data processing device may be used with a program flow control unit 16 that conventionally increments a program counter and uses the program counter to address instructions, without mapping to target instructions. In this case, in one embodiment the data processing device comprises software and/or hardware to pre-process the program before execution. Preprocessing is performed so that the rearrangement of the sequence of instructions is undone. This can be done efficiently because cache misses are avoided. It may not be necessary to undo the rearrangement for the entire program at once. Instead respective program sections may be preprocessed one at a time, each time before the processor starts executing them. As another embodiment jump instructions may be added to the program, to enable the processor to jump according to the rearranged order of instruction. Jump instruction targets may be encrypted, in which case the data processing device may comprise a software or hardware decryptor for decrypting the targets. As another embodiment a list of jumps may be provided to the data processing device separately from the program and used by the program flow control unit 16 during execution. Entries on this list may specify a set of combinations of a jump location and a jump target.

Program Conversion

Figure 2:
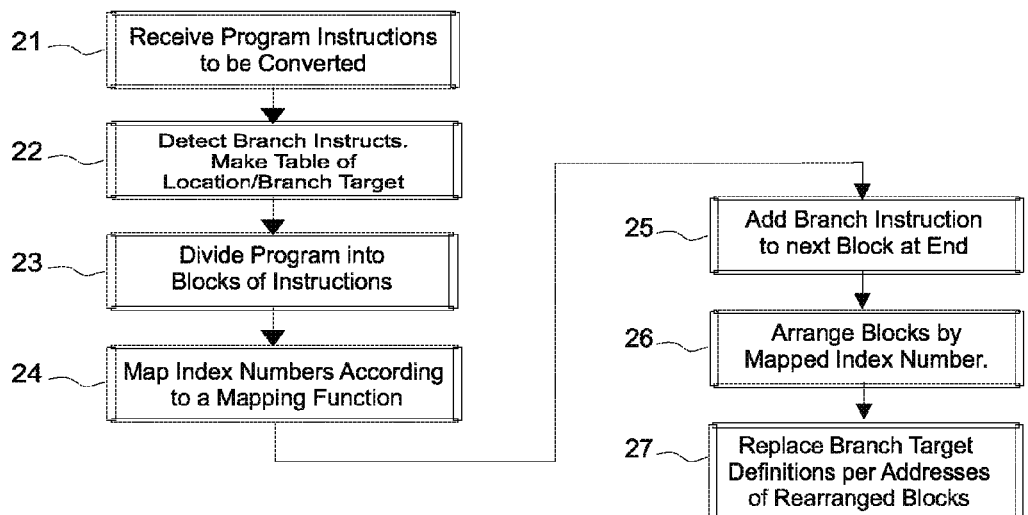
FIG. 2 shows a flow chart of program conversion

FIG. 2 shows a flow-chart of program conversion. Program conversion is used before storing the instructions of the program into memory 10 for execution. Program conversion may be performed by a program conversion apparatus, such as a computer that is programmed to perform program conversion. In a first step 21 the program conversion apparatus receives a program of instruction that has to be converted. In a second step 22 the program conversion apparatus detects branch instructions in the program and makes a table with the location and branch target of the branch instructions.

In a third step 23 the program conversion apparatus divides the program into blocks of instructions. Preferably a block is defined for each branch target, starting at the instruction at the branch target. Optionally additional blocks may be formed that do not start at branch targets. In an embodiment blocks may contain no more than a single instruction. Each block extends to the start of the next block. The blocks are given index numbers, for example in order of appearance in the program. In a fourth step 24 the program conversion apparatus maps the index numbers according to a mapping function. In a fifth step 25 the program conversion apparatus adds a branch instruction to the next block at the end of each block in order of appearance. In a sixth step 26 the program conversion apparatus forms the converted program by arranging the blocks in order of their mapped index number. In a seventh step 27 the program conversion apparatus replaces definitions of branch targets in the branch instructions of the program according to the addresses of rearranged blocks.

Optionally, fifth step 25 may be omitted or replaced by a step that adds information to the program to indicate the start of a new block, in which case the processor that executes the program must provide the missing information about the address, for example by reconstructing the original block sequence in a local program memory, by adding branches at the end of blocks or by effecting instruction address jumps during execution at its own initiative, without explicit branch instructions.

In an embodiment every block contains no more than one instruction. Thus instruction address jumps occur after each instruction.

Instruction Address Maps

The mapping function preferably has the properties that it makes efficient use of instruction memory, that it preserves cache efficiency and that it makes reconstruction of the instruction sequence difficult. Efficient use of instruction memory means that not too many unused addresses are left to which no instructions are mapped. Preservation of cache efficiency means that the number of instruction address changes that lead to cache misses should be kept within bounds that can be handled by the cache. Making reconstruction of the instruction sequence difficult means that statistical properties of address steps between addresses of successively executed instructions should have some pseudo-random features. Thus, for example, the frequency distribution of the address steps should not be concentrated at a single step value, strong correlations between successive step values and frequently repeating patterns should be avoided.

These different properties may conflict. For example, making reconstruction of the instruction sequence difficult is best served by using random address steps through the entire address space, whereas cache efficiency depends on predictable address steps, preferably of unit size.

Figure 3:
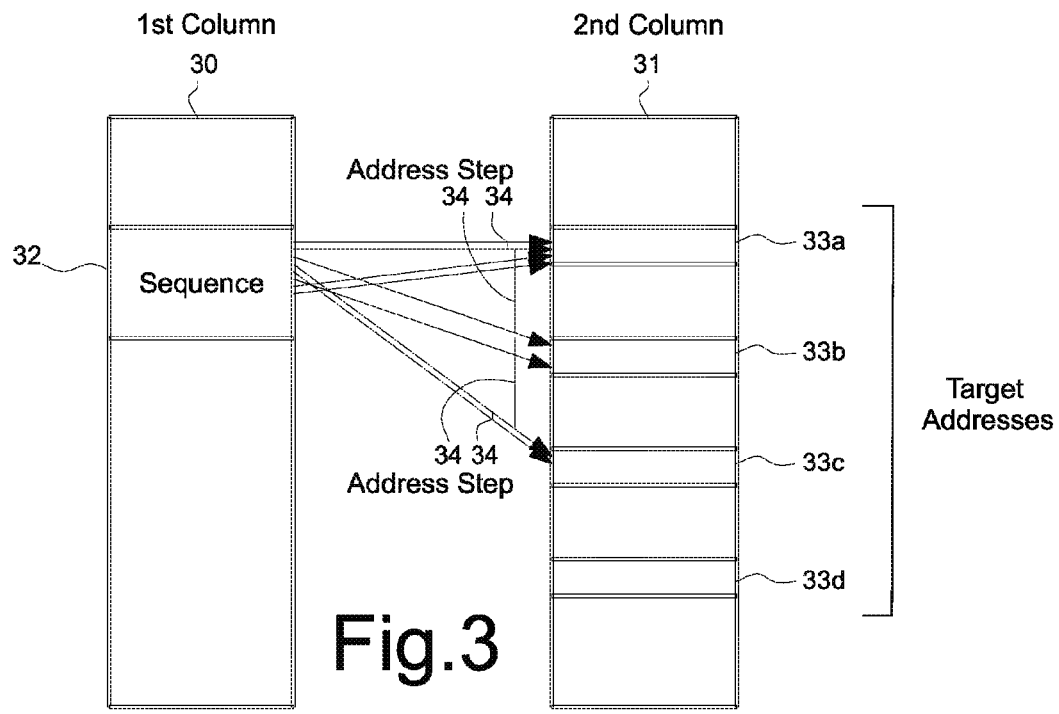
FIG. 3 illustrates address mapping

FIG. 3 schematically indicates a mapping that combines difficult reconstruction with cache efficiency. The locations of successive original instruction addresses before mapping are shown in a first column 30, representing a sequence of logically successive instructions. The locations of target addresses that are obtained by applying the mapping to the original instruction addresses are shown in a second column 31. As can be seen, successive original instruction addresses from a sequence 32 of instruction addresses are mapped to a limited set of disjoint ranges 33a-d of target addresses. Sequence 32 is a proper sub-sequence of the sequence represented by first column 30, in the sense that there are other sub-sequences in the column. By way of example a sequence 32 that contains sixteen instructions may be used with original instruction addresses that map to target addresses in four ranges 33a-d. Larger sequences of for example sixty four or two hundred and fifty six instructions, or a different number of instructions may be used. Original instruction addresses outside sequence 32 may be mapped to target addresses in sets of other ranges. This may be done on the bases of other sequences in first column 30 with a same size as sequence, each mapped to a different set of ranges. Typically part of the original instruction addresses outside sequence 32 map to target addresses between ranges 33a-d.

There are address steps between target instructions that are the map of successive original instruction addresses in sequence 32. By way of example a few address steps 34 have been indicated. As can be seen from the Figure the address steps may be steps within ranges 33a-d or between the ranges. The sequence of the original instruction addresses define a sequence of address steps, between target addresses that are the map of successive pairs of original instruction addresses. Different types of address steps are intermixed with each other in this sequence of address steps. A highly predictable sequence is avoided. Thus, for example, it would be highly predictable if successive parts of sequence 32 were mapped each to a respective one of the ranges 33a-d. This would correspond to a sequence of address steps that first contains address steps within a first range 33a, then a step to a second range 33b, followed bye steps within that second range 33b and so on. A less predictable sequence is realized by using a sequence of addresses steps that contains steps within other ones of the ranges 33b-d between the steps in the first range 33a and, therefore, also steps between the ranges between the steps in the first range 33a.

Preferably, the mapping of sequence 32 to ranges is one to one in the sense that all target addresses in the limited set of ranges 33a-d are the map of original instruction addresses from sequence 32, but a less dense mapping may be used wherein for example between half and all target addresses in the limited set of ranges 33a-d are the map of original instruction addresses from sequence 32. Any degree of filling may be used. Using at least half filling ensures that memory is used with at least fifty percent efficiency. Preferably, at least ninety percent filling is used and even more preferably a hundred percent filling is used. Of course there may be exceptional ranges that are not so full. As long as one or more (sub-) sequences of instructions are mapped to ranges that are at least half filled in the described way some improved locality is achieved, even if other sub-sequences do not fill ranges this much. Preferably, the majority of sequences of instructions in an obfuscated part of a program is mapped in this way, and more preferably only exceptionally, say less than ten percent, sequences are not mapped in this way.

When the original instruction addresses of first column 30 are divided into a plurality of sequences similar to sequence 32 shown in the Figure each sequence may be mapped to a different set of ranges in this way, the combined sets of ranges filling up the address space, so that a plurality of ranges of target address of other sequences lie between the ranges 33a-d of sequence 32. Thus everywhere in a program address steps between address steps within a range address steps in other ranges will occur.

In an embodiment the number and the size of the set of ranges 33 that is the map of sequence 32 is selected so that the sum of the sizes of ranges 33a-d is less than the cache memory size. This ensures that all instructions with original instruction addresses in sequence 32 can be held in cache together, reducing cache misses. But even if not all instructions are in cache, cache efficiency is improved because use of address steps within a range improves locality. Different ones of ranges 33a-d may be held in different cache lines, or groups of cache lines, while instructions with target addresses between ranges 33a-d need not be held in cache. Thus cache misses can be minimized. On the other hand the fact that mapping of sequence 32 is not limited to one continuous range and that steps in different ranges are intermixed makes it possible to realize a reordering of instructions that makes reconstruction of the instruction sequence difficult.

The use of a limited set of ranges 33a-d makes it possible to use a limited number of address step sizes, while still making reconstruction of the instruction sequence difficult. In an embodiment the size of the address steps within each range is limited to one instruction length, using for example only forward and backward address steps of that size. By using address steps in other ranges 33a-d between such forward and backward address steps, it can be ensured that different instructions will be addressed. Because address steps between adjacent instructions can be backward or forward reconstruction of the sequence is difficult. Because unit address steps are used cache efficiency may be improved because address steps within a range are local.

In an embodiment the size of the address steps between each pair of ranges 33a-d may also be limited to a single size for each pair and/or the address steps may be limited to steps between selected pairs of the ranges 33a-d. Of course, if steps between all pairs of ranges are used, the sizes for different pairs of ranges may differ, as the pair of ranges may be at different mutual distance. If a sequence of equidistant ranges is defined and address steps are limited to steps between adjacent ranges in the sequence, the number of different step sizes may be reduced even further. Use of a limited number of step sizes simplifies mapping and it may increase cache efficiency. It may also facilitate prefetching and pipelining for example by using parallel preprocessing of instructions from target addresses at address steps with the same size from a current address.

A Visualization

The mapping may be visualized by means of an array of points in a multidimensional space wherein the points represent target addresses. Each range 33a-d is then represented by a respective row in this array, along a first dimension. In this visualization target address steps of one instruction length correspond to movement in the first dimension in such a space. Movement in other dimensions corresponds to address steps between different ones of the ranges 33a-d. Thus, the sequence of map values of successive instruction address values can be visualized as a path in an n-dimensional space. In a further embodiment each range may correspond to a respective part of a row in the array, so that more than one range is associated with a row in the array, or a range may correspond to a plurality of rows in the array. However, for the sake of explanation a one to one correspondence between rows and ranges may be kept in mind.

Figure 3A:
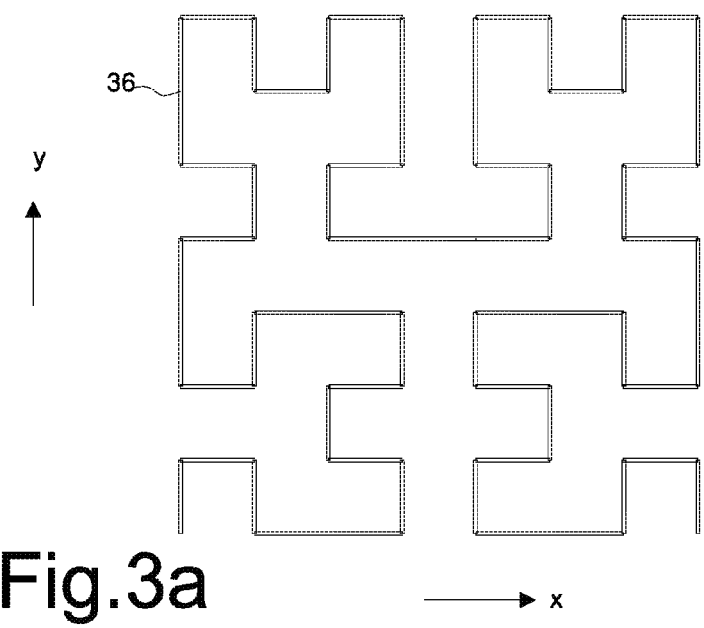
FIG. 3a shows a space filling path to visualize address mapping

FIG. 3a illustrates a two dimensional space with such a path 36 for use in defining the mapping function. It should be emphasized that the particular path 36 is shown only to illustrate the concept of a path: in practice other, more complex paths may be used. A part of a two dimensional array with rows and columns of locations with coordinates (x,y) is shown, wherein x and y have integer values. Each row corresponds to a different one of ranges 33a-d, i.e. the y-value is a label for the ranges 33a-d and the range takes up a section of the row. Steps in the x-direction within such sections correspond to steps within the ranges, steps in the y-direction correspond to steps between the ranges 33a-d. In one example, each point (x,y) defines a target address A according to $A=(b(y)+x)*L$, wherein L is the instruction length and the base addresses of the ranges are represented by $b(y)$ for different y-values represent. As a simple example a function $b(y)=A0+M*y$ may be used, wherein M is an integer greater than the range size and A0 is a constant.

A part of a space filling path 36 is shown. As noted a particular choice of the shape of path 36 is shown only to illustrate the concept of a path. This space filling path 36 may continue outside the part of the space that is shown. Space filling path 36 runs along respective points of the array successively, moving each time from a respective point to one of its neighbors and visiting each point exactly once. The path wanders in all dimensions, in the sense that the frequencies of steps in respective dimensions differ, if at all, by factors that are (much) smaller than the number of points in a row of the array, e.g. by no more than a factor two and steps in different dimensions are intermixed.

Thus, space filling path 36 defines a first function of the position "s" along path 36 to two dimensional coordinates $(x,y)=(Fx(s), Fy(s))$. The original instruction address, or its difference with a base address, divided by the instruction length, may be used as position s. Thus the target address is $(b(Fy(s))+Fx(s))*L$. If instruction index numbers are used s may represent successive instruction index numbers.

Use of space filling path 36 to define the mapping ensures efficient use of memory because the path visits all points of the array, with the effect that all target addresses in the ranges are used. Caching is efficient because the sequence 32 of sixteen addresses corresponding to s values along the illustrated path 36 is mapped to only four rows, i.e. in four ranges. This is the best case, worst case it is mapped to seven rows. Reconstruction of the original sequence is made difficult because the address steps are irregular: address steps within different ranges (rows) occur intermixed with each other along space filling path 36. Address steps within a range correspond to horizontal steps in path 36 in one row. Such horizontal steps may be to the left and to the right, corresponding to forward and backward address steps. As can be seen between such steps, steps to and within other rows occur.

In an embodiment a square array is used and the size of the two dimensional array is selected sufficiently large to provide points for a space filling path 36 with a length that exceeds the number of instruction addresses that need to be replaced. Alternatively, an array with smaller size or a different shape may be used. In the case of a small array, the program that has to be converted may be split into segments, each with no more addresses than in the path, conversion being applied to respective segments separately.

It should be noted that the composite function that is realized with a path 36 in n-dimensional space and mapping to ranges preserves a restricted amount of locality. At least when path 36 moves in a row (e.g. along the x-direction) locality is preserved. Only a limited number of address ranges 33a-d is normally used together, because there is a limited number of rows. Moreover, if the distance between base addresses b(y) does not exceed the locality distance of the cache, locality in the sense of not causing a cache miss, may also be preserved when path 36 moves along the y-direction. Thus, by using a space filling path 36 with local steps, cache locality is preserved to a much greater extent than for random address sequences.

Space filling paths such as path 36 may be realized for example by means of an explicit specification of points in path 36, stored in a look-up table, by means of a recursive definition, by an algorithm for computing path points, by means of tables of mapping values or by a mix of such methods. By way of example, the particular path 36 that is shown in the Figure was realized with a simple recursive definition.

Pseudo-Random Paths

In an embodiment a pseudo-random path may be used. In this the successive points in the array along the path may be computed by executing a pseudo random generator algorithm. Preferably, a key-based pseudo random algorithm is used, wherein the generated path is dependent on a key that may be stored in the processor and used during program generation but kept secret otherwise. Because pseudo-random algorithms for generating the path may be publicly known, this way a processor is not compromised as long as the key is kept secret. Different keys may be used in different integrated circuits, or each in a different group of integrated circuits.

If the path is not limited to steps between adjacent points in the array and separated ranges, the mapping may be realized by using any pseudo random permutation algorithm (a permutation algorithm is an algorithm that maps addresses A from a set onto addresses f(A) from that set in such a way that no two addresses are mapped to the same address). Many pseudo random permutation algorithms implementations are known per se, such as linear feedback shift register (LFSR) algorithms, linear iterative formulas of the type $Xn+1=A*X+B$ etc. In this case the generator polynomial of the LFSR or the values A, B and/or the initial state of the LFSR may be kept as secret key information in an integrated circuit. In an embodiment, the pseudo random permutation algorithm may be combined with an intra range mapping $g(f(A))$ that derives an intra-range address from the permuted address f(A) and a range-selection mapping $h(f(A))$ that derives a range selection from the permuted address f(A). By mapping to a set of ranges that are separated from each other by other ranges, which are not selected by the range selection mapping h, increased obfuscation is realized. The intra range mapping may be a simple mapping, such as obtained by selecting sets of bits from the permuted address. The range-selection mapping may similarly be simple, such as taking other bits of the permuted address and computing the range selection from these bits by any suitable function, or using a look-up table to determine the range selection.

Such algorithms may be implemented by means of arithmetic and/or logic circuits in mapping circuit 164, combined with a key memory to supply the keys needed for the computation. Alternative the computation of addresses may be performed in advance and the addresses may be stored in a look-up memory in mapping circuit 164. In the latter case a true random mapping may be stored instead.

In general pseudo random permutation does not necessarily result in address steps corresponding to a path 36 consisting of steps between neighbors in the n-dimensional array. In an embodiment the path is limited to such steps. Paths of this type may be defined by providing a key stream/secret mapping with n bits of key information for each address (n being the number of dimensions of the array), the n bits indicating the direction in which the path moves at each point. Such a key stream/secret mapping may be selected randomly or pseudo randomly in advance, with the constraint that a path without foldback is defined. As mentioned, the pseudo random algorithm can be key-based depending on a (smaller) key. The resulted key stream/secret mapping can be stored in a memory in an integrated circuit. When an instruction address is updated, the n-bits for that address are retrieved in the processor and used to determine the step to the next address value.

For example, each of the n bits could correspond to a respective step-part selected by the bits and the step in the address could be the sum of the selected step parts indicated by the n-bits. This may be implemented in mapping circuit 164 using a memory that stores n-bit key parts for respective instruction addresses (or groups of instruction addresses) and is addressed by (part of) the current instruction address, a lookup circuit to look up step parts corresponding to the n-bits and adders for adding the step parts to each other and to the current instruction address, to compute the next instruction address.

When such n-bit key parts are used, one step part may have selectable values plus and minus one for example, and another step part may have selectable values plus and minus the distance between pairs of the ranges of addresses. Optionally, the number of key bits per point may be reduced by making use of the fact that the path does not fold back. Thus, in a 2-dimensional example, only three possible step values need to be encoded per instruction address, instead of four. Accordingly, the step values for three instruction addresses may be encoded using five bits for example.

Any other type of algorithm for pseudo-randomly defining paths in an n-dimensional space may be used.

The program flow control unit may execute jump instructions by computing and adding successive steps along the path repeatedly according to the jump distance (the number of addresses between the jump origin and the jump target). As used herein the term jump instruction includes branch instructions. Jump address computation has the disadvantage that jumps may stall the processor. In an alternative embodiment the program flow control unit comprises a jump target memory, wherein addresses of targets of jump instructions are stored. These may be computed for example when a program is loaded. In this embodiment, when the program flow control unit encounters a jump instruction, it accesses the jump target memory and replaces the current instruction address with the jump target.

In another embodiment, jump information from jump instructions is used directly, for example by adding a jump distance from the jump instruction to the current instruction address or by replacing the current instruction address by a jump address from the jump instruction. In this embodiment the program may be preprocessed by a preprocessor to replace jump instruction information according to the key of the processor. During preprocessing the preprocessor, which may be a pre-processing program executed on any programmable computer, detects jump instructions in the pre-processed program, computes the jump targets of the detected instructions according to the key of the processor and the preprocessor replaces the jump information in the jump instructions according to the computed jump targets.

Recursive Definition

As noted another possible method of defining a path is by means of recursive definition. A recursive definition conceptually uses "cells", i.e. parts of space (cells will be called "tiles" in the following). A number of different cell types may be defined. The definition of a cell type defines the shape of cells of the type, without prescribing its scale, and how each cell of the type can be sub-divided into cells of various type with smaller scale, optionally into rotated and/or mirrored versions of these cells. By repeatedly applying such sub-divisions a cell can be hierarchically sub-divided into increasingly smaller cells.

In the recursive definition a path is divided into path parts in respective cells, which are in turn divided into smaller path parts in smaller cells in a hierarchical subdivision. Thus ensuring complete, or nearly complete coverage of all points in space is split into sub-problems of increasingly smaller scale. For each type of cell locations of an entry point and an exit point for a path within the cell may be defined in terms of its position at the boundary of the cell relative to its corners. The subdivision of a cell is defined so that its entry and exit point correspond to an entry point and exit point of sub-dividing cells and internally exit points and entry points of successive cells coincide, optionally after inverting the path direction in the cell. When the space contains an array of points, the hierarchically sub-dividing cells contain increasingly smaller sub-arrays. For a sub-array at some minimum size a path may be defined explicitly, which covers all points in the sub-array. Thus, through the hierarchy the entire path is defined. Although this definition is has been given in terms of cells, it should be appreciated that the definition for a same path can take many forms. As one example, an L-system grammar may be used.

The space filling path 36 of FIG. 3a, for example, can be defined by means one type of tile of square shape. A highest level cell (tile) contains an eight times eight array of points. The highest level cell is subdivided into four middle level cells, which each contain a four times four sub-array. Each middle level cell in turn may be subdivided into four low level tiles, which each contain a two times two sub-array. The path in each lowest level cell is obtained by rotating, mirroring and/or inverting the sequence of a same basic path.

An unlimited variation of paths can be generated by means of recursive definitions, by using differently shaped cells and/or different sub-divisions and different explicitly defined paths for a smallest cell (which may be larger cells than in the example of FIG. 3a, thus for example, a path could be explicitly defined for a four times four cell or an eight times eight cell). The explicitly defined paths need not be limited to paths with steps in the x direction and y-direction: diagonal steps or steps to even further neighbors may be used as well. In addition, different explicitly define paths may be used for the same type of cell at different places in the same array of points. Although an example has been given for two-dimensional paths for the sake of illustration, it should be appreciated that paths in spaces of higher dimension can be used.

The coordinates of a point in the array may be determined as a function of the position along the path by means of look-up operations and/or computations that leave such paths implicit. From s, the various cells in the hierarchical subdivision can be determined that contain the point. When each cell is divided into a power of two (e.g. four) smaller cells and a path of a power of two of points is defined for a smaller cells, successive groups of bits of the digital representation of s identify the cells in which the point along the path at position is located and their position and orientation relative to the larger cells (e.g. in FIG. 3a, the digital representation of s would have six bits, of which the two most significant bits determine the four by four cell, the middle two bits determine the two by two cell within the four by four cell and the least significant two bits determined the position within the cell). More generally, an index $s(0)$ of the highest level cell to which the point at a position s along the path belongs follows from the integer part of $s/N(1)$, the division of s by the number of points $N(1)$ in the next lower level cells. The index $s(1)$ of the next lower level cell to which the point belongs follows from the integer division $R(1)/N(2)$ of the remainder $R(1)=s-N(1)*s(0)$ of s by the number of points in the next next lower level cells and so on. As mentioned, when $N(i)$ is a power of two, this amounts to taking groups of bits from the digital representation of s. The number of points $N(i)$ in each cell at a level "i" can be determined from the sum of the numbers of points of the lower level cells $N(i+1)$ into which it is subdivided.

The definition of the sub-division may be represented in a look-up table circuit storing information $P(c)$ for each cell in a sub-division (an index of these cells being labeled by c), representing the type of the cell, its position relative to the larger cell that it subdivides, its orientation relative to this larger cell and the direction in which the path in the cell is followed (backward or forward) relative to that larger cell. Optionally P may also depend on the type of cell that is subdivided. The information $P(s(0))$ for the highest level cell can obtained with the look-up table circuit, using the index $s(0)$ of this cell. The next m bits can be used to look up similar information $P(s(1))$ for the cell at the next lower level of the subdivision. Combined with the information $Q(0)$ representing position, orientation relative and path direction of the preceding level cell in the subdivision relative to the highest level cell, this information P' can be used to determine information $Q(1)=f(Q(0),P(s(1)))$ representing the position, orientation and path direction of the cell at the next lower level relative to the highest level cell and so on for information $Q(i)$ at successive levels indicated by "i". The function "f" represents the composition of offsets, rotations and path directions and can be determined by arithmetic computations or by means of look-up (which may be combined with the look-up of P). Thus the position in the array may be obtained from indices $s(i)$, such as successive groups of bits of the digital representation of s.

Alternatively, an incremental computation may be used of successive points along the path. As will be appreciated only the lowest level index $s(i)$, (e.g. group of bits from the digital representation of s) changes each time when s incremented. When the indices for higher levels i' do not change, the information $Q(i')$ for these higher levels does not change either. In this case the location in the array for a position s along the path can be determined by updating the previous location for position s-1 by an offset determined from the lowest level information P, or by adding an offset from this lowest level to a base point of the lowest level cell. The information $Q(i')$ for other levels needs to be updated only for selected steps in the value of s. Future values $Q(i)$ for various levels may be computed in advance for use when such a step occurs, or they may be computed when such a step occurs.

It should be emphasized that for the mapping of instruction addresses the paths are important only as a visualization. Part of one coordinate of a point in an array represents a position in a range of target addresses and the remaining part and the remaining one or more coordinated represent a selection of a range, i.e. the base address of the range. The original instruction address A corresponds to the position "s" along the path, for example according to $s=A-A0$, where A0 is a base address. Thus the look-up information P and the function f define a selection of a range and a position in the range as a function of the original instruction address A.

Secrecy

When the relevant information that defines the mapping is known, it may of course be possible to reconstruct program sequence. In order to prevent this, the information is preferably kept secret, by including it in a program flow control unit so that it cannot easily be read out. To improve protection of secrecy, different maps, and therefore differently reordered programs, may be used for different integrated circuits or groups of integrated circuits.

To realize a large range of possible mappings, relatively large cells with lowest level information P may be used, which define different basic paths for use in different processors. In one embodiment, the entire address space may be handled as one such lowest level cell, so that effectively no (multi-level) recursive definition is used.

In terms of the example of FIG. 3a, a lowest level cell (tile) of eight times eight points may be used for example, with a look-up circuit that defines successive positions along a path in that cell. The information in the look-up circuit of a processor enables it to execute programs that have been reordered accordingly.

In order to improve secrecy even more, different basic paths are preferably used in different cells of the same mapping. This corresponds to using a larger number of different types of cell, with alternative, different basic paths, even though these cells may have the same shape. In this case the definition of the sub-divisions in the information P may define a division into cells of different types. Optionally, this is done at a number of levels of cells. Both this use of alternative cell types in the sub-divisions and the definitions of various basic paths may be kept secret within a processor, if the programs for the processor are reordered according to the corresponding mapping before they are distributed to the processor.

In this way the program can be divided into a plurality of sequences of instruction addresses that are mapped to target addresses under control of secret information. Different parts of the secret information may be used for respective sequences, so that the secret information for each sequence affects only that sequence. In this way, reconstruction of the order of instructions of one sequence does not make it possible to reconstruct other sequences.

Hardware Adaptations for Recursive Mapping

As described in the preceding the obfuscation using a space filling path may be used to convert the program, including the addition of branch instructions to modified addresses from the ends of blocks. In this case a program flow control unit such as shown in FIG. 1a may be used. In alternative embodiments the data processing apparatus may be adapted to perform part of address mapping. In this case program conversion may rearrange parts of a program without including additional information. In this case program flow control units such as shown in FIG. 1a or 1b may be used.

In one embodiment instructions are rearranged according to address mapping obtained with a recursive definition according to an L-grammar. In this embodiment program flow control unit 16 may have a stacked structure configured to update the addresses for obtaining successive instructions according to address mapping obtained with the recursive definition.

Figure 4:
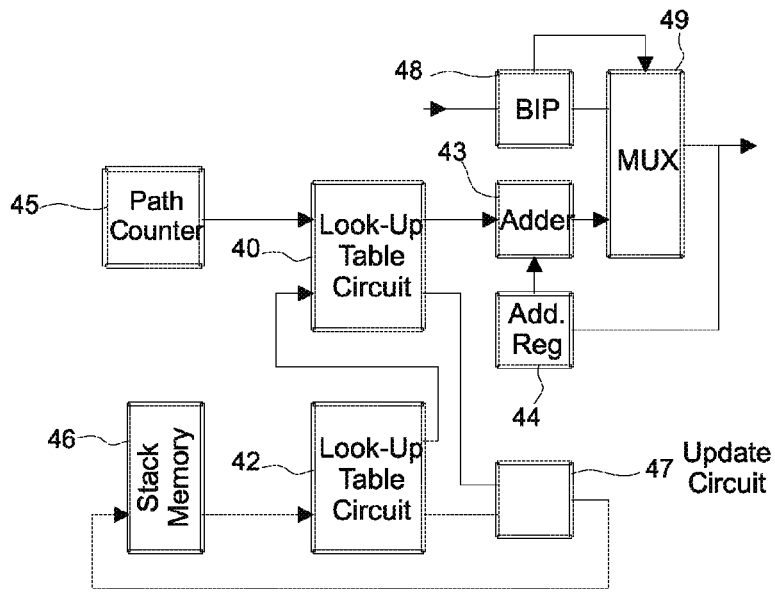
FIG. 4 shows a program flow control unit

FIG. 4 shows an example of an embodiment of a program flow control unit for performing updating using a space filling path. The program flow control unit comprises a first look-up table circuit (LUT circuit 40) which defines positions along a path through a minimum size tile and a second first look-up table circuit (LUT circuit 42) which defines information about successive tiles in a subdivision of a larger tile. Furthermore, program flow control unit 16 comprises an adder 43, an address register 44, a path counter 45, a stack memory 46, a stack update circuit 47, a branch instruction processor 48 and a multiplexer 49.

Address register 44 has an output coupled to a first input of adder 43. Adder 43 has an output that forms an instruction address output of the program flow control unit and is coupled to an input of address register 44. Branch instruction processor 48 has an input for receiving branch instructions, and an output coupled path counter 45.

In operation instruction addresses are stored successively in address register 44 in successive instruction cycles. Branch instruction processor 48 detects whether an instruction received from the instruction issue circuit (not shown) comprises a branch command. If no branch is detected adder 43 computes the instruction addresses by adding increments from first LUT circuit 40.

Stack memory 46 has outputs coupled to second LUT circuit 42. Second LUT circuit 42 and path counter 45 have inputs coupled to first LUT circuit 40. First LUT circuit 40 has outputs coupled to a second input of adder 43 and to stack update circuit 47. Second LUT circuit has an output coupled to an input of stack memory 46 via stack update circuit 47.

First LUT circuit 40 stores increment values of the addresses according to a space filing paths in tiles of minimum size. First LUT circuit 40 also stores an indication of an end of the path in a tile. Path counter 45 indicates the position in the path to first LUT circuit 40 and second LUT circuit 42 indicates the type and orientation of the path. As a result first LUT circuit 40 outputs increment values to adder 43, where they are added to address values from address register 44.

Second LUT circuit 42 stores information P about of the type, relative orientation etc. of successive tiles in a subdivision of a larger tile, for each type of tile. Stack memory 46 is configured to store a stack of information about successively smaller tiles. In an embodiment the information in stack memory 46 may be a combination of data (T,A,I), wherein T indicates a type of tile, A indicates an orientation of the tile, and I indicates an index in the subdivision of the tile. Such combinations may be stored for successively larger tiles. Stack memory 46 outputs the information about of a current tile to second LUT circuit 42.

During operation path counter 45 is incremented in each instruction cycle. Once the count from path counter 45 reaches a count value that corresponds to the end of a path in a minimum size tile, first LUT circuit 40 provides this indication to stack update circuit 47. In response stack update circuit 47 updates the tile at the top of the stack in stack memory 46. This may be done by incrementing the index I in the subdivision unless second LUT circuit 42 indicates that the index value corresponds to the final tile in the subdivision. When the index is incremented this has the effect that second LUT circuit 42 outputs the type and orientation of the next tile to first LUT circuit 40.

When the index value corresponds to the final tile in the subdivision, stack update circuit 47 operates recursively. The top level is treated as a first level and the level of the stack next below the top is treated as a second. lower level. If possible stack update circuit 47 increments the index in the information at this second, lower level and uses the output second LUT circuit 42 in response to this incremented index to select the new information at the first level, setting the index at the first level to its initial value. If the index at the second, lower level is also at the end of its range this operation is applied with the second, lower level as first level and the next lower level as second, lower level and so on recursively.

When branch instruction processor 48 detects that an instruction received from the instruction issue circuit (not shown) comprises a branch command, it computes new corresponding contents of path counter 45 and stack memory 46 and replaces the contents of path counter 45 and stack memory 46 accordingly, when executing the branch instruction. Optionally, when the branch has a small branch distance branch instruction processor 48 may cause a series of count pulses corresponding to this distance to be applied to path counter 45 while disabling execution of the corresponding intervening instructions.

To reduce the time needed for performing branches, branch instructions may include parameters indicating stack content and a path count value after the branch. In an embodiment that applies this alternative, branch instruction processor 48 may be configured to load data from the branch instruction into path counter 45 and stack memory 46 under control of the branch instruction.

It should be appreciated that the circuit of FIG. 4 has the effect that the time needed for determining the next instruction address may vary dependent on whether the end of tiles at various levels is reached or a branch instruction is executed. Stack update circuit 47 may be configured to issue a stall signal to stall operation of the data processing circuit if this occurs.

Figures 5A, 5B:
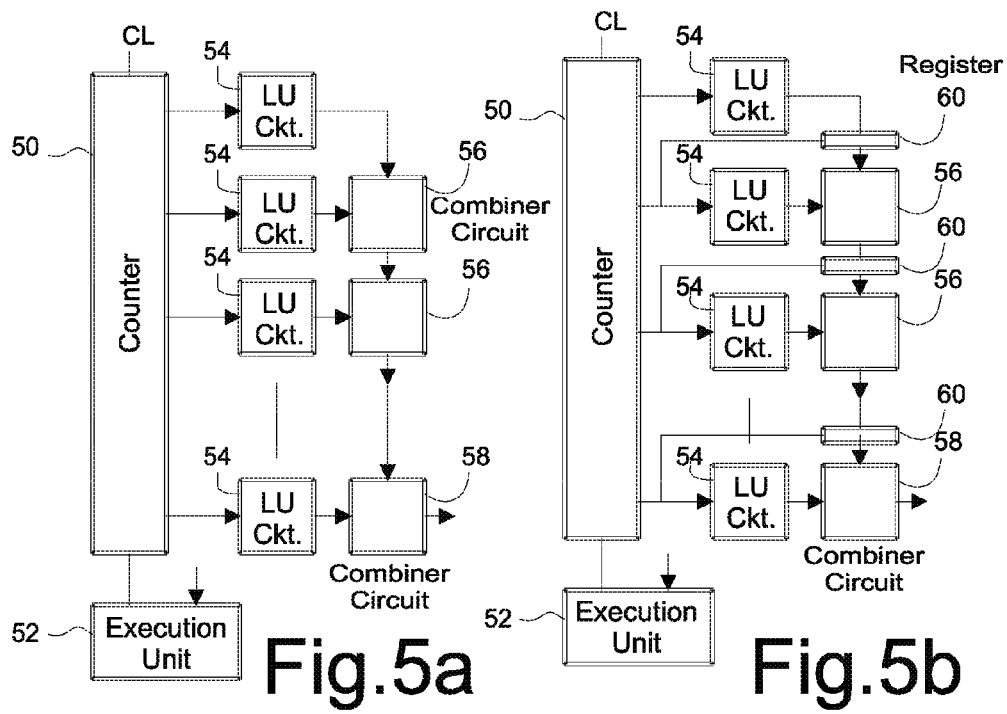
FIGS. 5a, 5b show a program flow control unit

FIG. 5*a* shows a program flow control unit with a counter 50, a branch execution unit 52, a plurality of look-up circuits 54 and a plurality of combiner circuits 56, 58. Counter 50 has a clock input CL and outputs for successive groups of count bits, coupled to respective ones of the look-up circuits 54. Branch execution unit 52 receives the groups of count bits for use in computing branch target (for the sake of clarity, the connections are not shown explicitly). A first one of the combiner circuits 56 has inputs coupled to outputs of the look-up circuit 54 for the most significant group of bits and the look-up circuit 54 for the group of bits next to the most significant group of bits. The other combiner circuits 56, 58 are each associated with a group of bits of the counter and have inputs coupled to an output of the look-up circuit 54 for that group of bits and the combiner circuit 56 associated with the next more significant group of bits. The combiner circuit 58 associated with the least significant group of bits outputs a target address to the instruction issue unit (not shown).

In operation counter 50 counts up. Optionally an instruction decoder (not shown) may be used to control the increments of the counter dependent on instruction length, but this is not needed if all instructions have the same size or if they are stored at equal distances. Different look-up circuits 54 and combiner circuits 56, 58 perform target address computations for cells at different levels in parallel. Look-up circuits 54 effectively implement application of the information P as a function of path index and combiner circuits 56, 58 implement application of the composition function f(Q,P). Alternatively, look-up circuits 54 and combiner circuits 56, 58 may be folded into one look-up circuit 54 and combiner circuit 56, 58 that performs the corresponding operations successively, using registers to store the results for the different levels. This may result in the architecture of FIG. 4.

FIG. 5*b* shows a pipelined version of the circuit, with registers 60 between combiner circuits 56, 58 and between the look-up circuit 54 for the most significant group of bits and the first combiner circuit. In this case, look-up circuits 54 combiner circuits 56, 58 may be configured to perform look-up and combination of values for next future values of the group of bits, the registers 60 being responsive to detection of imminent transition of the group of bits to the future value, copying new combiner results into the register when an imminent transition is detected.

Optionally the look-up circuits of the program flow control units of FIGS. 4 and 5*a* may be fuse programmable, or contain a non-volatile memory to define the look-up functions. Thus the processor can be provided with secret information that defines the mapping.

For example, in the program flow control unit of FIG. 5*a*, the look-up circuit 54 for the least significant group of bits may be programmed to define a plurality of alternative basic path parts of different types of lowest level cells. Thus, cell type selections made by higher level look-up circuits 54 will have the effect that different paths are used in the mapping.

Similarly, the look-up circuits 54 for the more significant group of bits may also be programmable, so that different sub-divisions into cells can be used in different processors to define different mappings. This makes it more difficult to reconstruct programs.

Alternatively, or in addition, different devices in a family can be realized by using different starting points along a path in different devices. This may be implemented by adding a circuit in program flow control unit 16 (e.g a ROM) that represents initial values for the count in path counter 45 and the stack in stack memory 46, and causing program flow control unit 16 to load these initial values before starting execution of a program.

Other Hardware Adaptations

FIGS. 4 and 5*a*, have been used to illustrate an embodiment wherein the address of all instructions is mapped. As an alternative, only branch targets may be mapped. In this case each branch instruction may comprise a target number.

Branch instruction processor 48 performs a computation to convert this number into an address, as described for branching in the context of FIG. 4. As another embodiment the mapping may be used only for a part of the instruction address, the remaining part being used without mapping. In an embodiment only a group bits is mapped (e.g. sixteen bits), the more significant bits of the program counter being used without mapping. This makes it possible to map large address spaces with a limited amount of circuitry, will still obfuscating local program structure. The least significant n-bits may be mapped for example, to make the program maximally unintelligible, or bits between two levels of significance may be mapped, so that cache locality is preserved for less significant bits.

Further measures may be used to obfuscate the program even further. Thus, instructions may be encrypted before distribution and decrypted in the instruction issue circuit before execution.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of converting a program of instructions for a programmable processor, the method comprising reordering a sequence of the instructions, whereby original instruction addresses are mapped to respective target addresses, the sequence comprising successive sub-sequences, the method comprising:
    mapping each sub-sequence of the sequence to addresses in a respective set of mutually disjoint ranges, separated by further ranges to which other ones of the sub-sequences are mapped,
    filling at least half of each of the disjoint ranges in the respective set of mutually disjoint ranges with instructions from the sub-sequence,
    providing address steps between the target addresses to which successive ones of the original instruction addresses are mapped for each sub-sequence, the address steps for the sub-sequence comprising first address steps within at least a first one of the mutually disjoint ranges and, between said first address steps, second address steps within at least a second one of the mutually disjoint ranges; and
    wherein the target addresses are computed based on a hierarchy with successive levels of cells, each cell corresponding to a respective set of ranges, cells at successively lower levels corresponding to sub-sets of ranges that are sub-sets of the sets of cells at higher levels, the cells in the hierarchy being associated with indices, the method comprising:
    providing sub-division information that defines the sets of ranges as a function of values of the indices;
    providing path information that defines respective ones of target addresses to which respective values of the indices map within the set of ranges of a lowest level cell;
    deriving a set of values of the indices for at least one of the original instruction addresses;
    accessing the sub-division information using the set of values of the indices to index the sub-division information;
    combining the accessed sub-division information from different levels to define the set of ranges of the lowest level cell for said at least one of the original instruction addresses,
    accessing the path information using the set of values of the indices to index the path information;
    using the accessed path information to select the target address for the at least one original instruction address within the set of ranges defined by combining the accessed sub-division information.

2. A method according to claim 1, comprising:
    providing alternatives included in the path information, the alternatives defining a plurality of mutually distinct alternatively relations between the respective ones of target addresses and the values of the indices,
    combining respective accessed sub-division information obtained for mutually different ones of the original instruction addresses respectively;
    using the combined respective accessed sub-division information to control selection of respective different ones of the alternatives for determining the target addresses for the mutually different ones of the original instruction addresses.

3. A method according to claim 1, comprising providing a family of processing circuits, each comprising a program flow control circuit comprising the sub-division information and the path information, different ones of the processing circuits of the family comprising mutually different path information.

4. A computer program product, comprising a program of instructions that, when executed by a programmable computer, cause the programmable computer to execute the method of claim 1.

5. A data processing device, comprising a programmable processor, the programmable processor comprising:
    a functional unit for executing instructions from a memory,
    an address output for supplying target addresses of instructions to the memory;
    a program flow control unit configured to determine the target addresses for supply to the address output, the program flow control unit being configured to introduce address steps of position dependent size and/or direction between target addresses of instructions at logically successive positions in the program,
    wherein the program flow control unit is configured to determine a set of respective target addresses for successive original instruction addresses, with successive address steps between the target addresses that are determined for successive ones of the original instruction addresses, the respective target addresses of the set lying in a plurality of non-overlapping address ranges, the set of respective target addresses filling at least half of each of the mutually non overlapping ranges of the plurality with instructions, the successive address steps comprising first address steps within at least a first one of the mutually non-overlapping ranges and, between said first address steps, second address steps within at least a second one of the ranges; and wherein the data processing, device is configured to determine target addresses based on a hierarchy with successive levels of cells, each cell corresponding to a respective set of ranges, cells at successively lower levels corresponding to sub-sets of ranges that are sub-sets of the sets of cells at higher levels, the cells in the hierarchy being associated with indices, the device comprising:

a program counter;

a look up circuit providing sub-division information that defines the sets of ranges as a function of values of the indices and path information that defines respective ones of target addresses to which respective values of the indices map within the set of ranges of a lowest level cell, the lookup circuit having inputs coupled to the program counter for receiving index values;

a combining circuit configured to combine sub-division information from different levels that has been accessed under control of the program counter to define the set of ranges of the lowest level cell for said at least one of the original instruction addresses and to combine the accessed path information to select the target address for the at least one original instruction address within the set of ranges defined by combining the accessed sub-division information.

6. A data processing device according to claim 5, wherein the look-up circuit is configured to provide alternatives for the path information, the alternatives defining a plurality of mutually distinct alternatively relations between the respective ones of target addresses and the values of the indices, the combining circuit being configured to combine respective accessed sub-division information obtained for mutually different ones of the original instruction addresses respectively and to use the combined respective accessed sub-division information to control selection of respective different ones of the alternatives for determining the target addresses for the mutually different ones of the original instruction addresses.

* * * * *